United States Patent [19]

Watanabe et al.

[11] 4,353,021
[45] Oct. 5, 1982

[54] CONTROL CIRCUIT FOR A PULSE MOTOR

[75] Inventors: Kazuo Watanabe, Hachioji; Hachiro Makabe, Fussa, both of Japan

[73] Assignee: Janome Sewing Machine Co. Ltd., Tokyo, Japan

[21] Appl. No.: 131,358

[22] Filed: Mar. 18, 1980

[30] Foreign Application Priority Data

Mar. 26, 1979 [JP] Japan ................................. 54-35211

[51] Int. Cl.³ ............................................. G05B 19/40
[52] U.S. Cl. ................................... 318/696; 318/681
[58] Field of Search ............... 318/696, 685, 599, 341, 318/681

[56] References Cited

U.S. PATENT DOCUMENTS

| | | | |
|---|---|---|---|
| 3,824,440 | 7/1974 | McIntosh | 318/696 |
| 3,893,012 | 7/1975 | Lin | 318/696 |
| 3,909,693 | 9/1975 | Yoshitake et al. | 318/696 |
| 4,163,931 | 8/1979 | Seitz et al. | 318/599 |

Primary Examiner—J. V. Truhe
Attorney, Agent, or Firm—Michael J. Striker

[57] ABSTRACT

A control circuit is disclosed for operating a pulse motor which contains a first winding and a second winding. A first bridge can connect the first winding to a power source in two directions and can also disconnect the first winding therefrom. Likewise, a second bridge can so connect and disconnect the second winding from the power source. A sequencer operates the bridges so that such connection and disconnection takes place according to a predetermined sequence, in order to allow the motor to be rotated in discrete steps. A comparator stage compares current flowing through the first and second windings with an adjustable voltage reference, and regulates the bridges so as to regulate such current in accordance with a value to which the adjustable voltage reference has been adjusted. A means adjusts the adjustable voltage reference in accordance with the predetermined sequence. The control circuit reduces power consumption by the pulse motor and thereby allows a smaller torque pulse motor and a smaller power source to be utilized.

5 Claims, 9 Drawing Figures

FIG_1
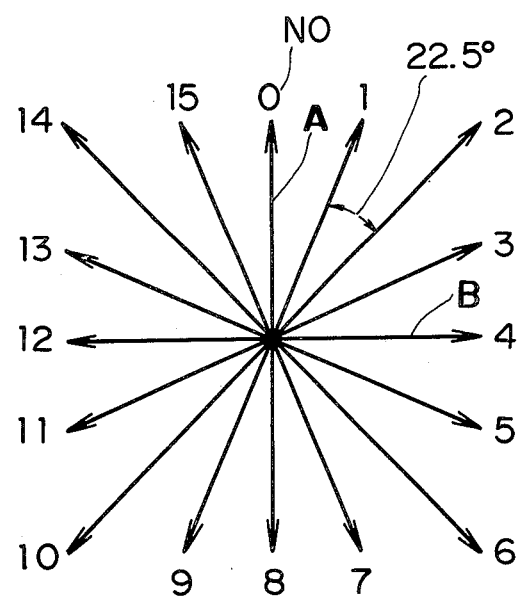
FIG_2
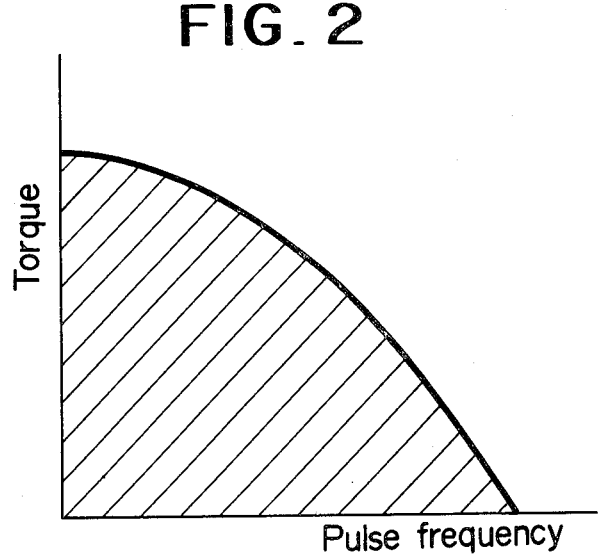

FIG. 5

| a1 | a2 | a3 | a4 | A | $\bar{A}$ | B | $\bar{B}$ | $\dot{A}$ | $\dot{B}$ | Vector NO |
|---|---|---|---|---|---|---|---|---|---|---|
| 0 | 0 | 0 | 0 | 1 | 0 | 0 | 0 | 0 | 0 | 0 |
| 0 | 0 | 0 | 1 | 1 | 0 | 1 | 0 | 0 | 1 | 1 |
| 0 | 0 | 1 | 0 | 1 | 0 | 1 | 0 | 0 | 0 | 2 |
| 0 | 0 | 1 | 1 | 1 | 0 | 1 | 0 | 1 | 0 | 3 |
| 0 | 1 | 0 | 0 | 0 | 0 | 1 | 0 | 0 | 0 | 4 |
| 0 | 1 | 0 | 1 | 0 | 1 | 1 | 0 | 1 | 0 | 5 |
| 0 | 1 | 1 | 0 | 0 | 1 | 1 | 0 | 0 | 0 | 6 |
| 0 | 1 | 1 | 1 | 0 | 1 | 1 | 0 | 0 | 1 | 7 |
| 1 | 0 | 0 | 0 | 0 | 1 | 0 | 0 | 0 | 0 | 8 |
| 1 | 0 | 0 | 1 | 0 | 1 | 0 | 1 | 0 | 1 | 9 |
| 1 | 0 | 1 | 0 | 0 | 1 | 0 | 1 | 0 | 0 | 10 |
| 1 | 0 | 1 | 1 | 0 | 1 | 0 | 1 | 1 | 0 | 11 |
| 1 | 1 | 0 | 0 | 0 | 0 | 0 | 1 | 0 | 0 | 12 |
| 1 | 1 | 0 | 1 | 1 | 0 | 0 | 1 | 1 | 0 | 13 |
| 1 | 1 | 1 | 0 | 1 | 0 | 0 | 1 | 0 | 0 | 14 |
| 1 | 1 | 1 | 1 | 1 | 0 | 0 | 1 | 0 | 1 | 15 |

CONTROL CIRCUIT FOR A PULSE MOTOR

The present invention relates to a pulse motor driving circuit, and more particularly to a device which automatically lowers the energizing current when a pulse motor is at rest.

With respect to a pulse motor having energized coils (called as A-coil and B-coil) which are orthogonal to each other, the A-coil, for example, is energized with the full electric current as shown by the vector diagram in FIG. 1, and then the B-coil is energized with the full electric current multiplied by tan 22.5° and subsequently the A-coil and B-coil are energized with the full current, and then the A-coil is energized with the full electric current multiplied by tan 22.5° and the B-coil is energized with the full current, and then the B-coil is energized with the full current, thereby to rotate the pulse motor 90° in the clockwise direction. Subsequently, a further rotation 22.5° of the pulse motor is obtained by the energization of B-coil and the energization of the A-coil with the current in the opposite direction and multiplied by tan 22.5°. Similarly, rotation of 360° is obtained by using 16 vectors in this embodiment with a combination of the energizations including the current in the reverse direction of B-coil. FIG. 2 shows a pull-in torque to a driving pulse frequency of the pulse motor, that is, a starting load torque to the driving pulse frequency, and a self-starting range is hatched. The pulse motor cannot follow synchroneously unless the load torque becomes smaller as the driving pulse frequency becomes higher. This is because the load of the pulse motor is in general the friction and inertia movement including the rotor of the motor itself (or sometimes including a spring action in one rotating direction), and the inertia movement of the rotor serves as a load in proportion to the accelerating degree, and the inductance of the motor coils gives a influence to the response to the pulse frequency. This fact means that when a motor is rotated with higher pulse frequency to a certain load, the pulse motor requires a larger torque is required. On the other hand, a holding torque at the time of standstill of motor approximates the torque at the pulse frequency 0 in FIG. 2, at which there is no acceleration and no drive pulse, and the pulse motor is driven with a smoothed constant current and is not influenced by the inductance of the coils. Further since the friction at the line of standstill of the motor serves as a force for holding the motor, the torque is in general higher than necessary.

The present invention has been devised to eliminate the defects and disadvantages of the prior art. It is a primary object of the invention to simplify the structure and to offer a device economically.

It is a second object of the invention to reduce the consumption of power and to provide stable operation.

It is a third object of the invention to enable the device in a small size.

Other features and advantages of the invention will be apparent from the following description of the invention in reference to the preferred embodiment as shown in the attached drawings.

BRIEF DESCRIPTION OF THE DRAWINGS

FIG. 1 shows a vector in energizing condition of the pulse motor,

FIG. 2 is a characteristic view of a pull-in torque of the pulse motor,

FIG. 5 is a Table designating energization of the coils A and B of the pulse motor.

DETAILED DESCRIPTION OF THE INVENTION

Figure 3:
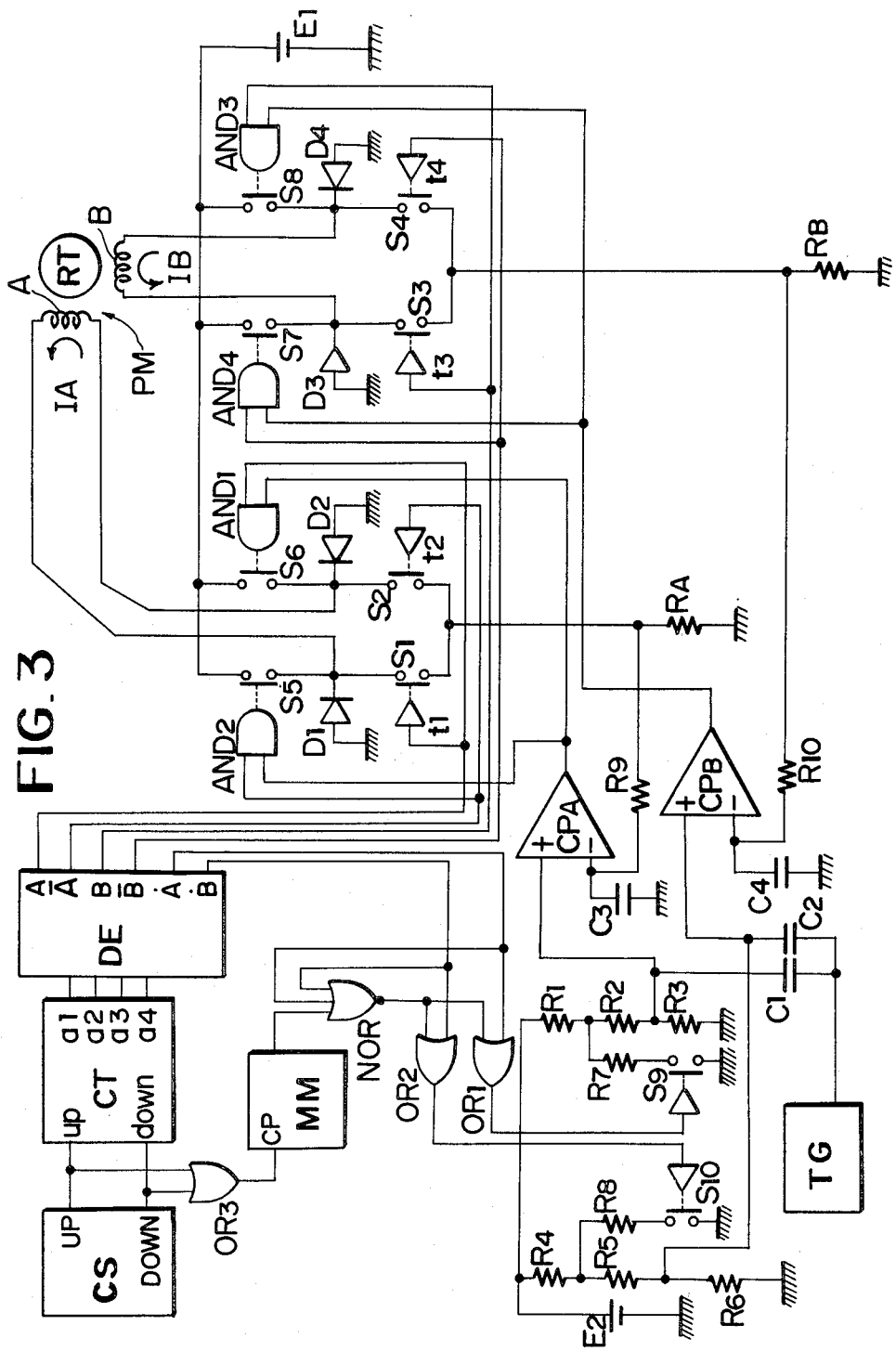
FIG. 3 is a block diagram of a pulse motor control circuit showing an embodiment of the invention.

Since the pulse motor of this invention needs the control including, as value of the full electric current x tan 22.5°, the electric current of any one of A-phase and B-phase, this control circuit is made partially common in order to include energization which makes the current of both A-phase and B-phase a value of the full current x tan 22.5° in response to a rest phase of the motor at rest, and reduces waste consumption of power by lowering the average current in at least combination where the both coils are not of the full electric current at the same time, and makes moderate increasing of temperatures of the motor, and makes the power source of driving the motor small capacity.

A reference will be made to an embodiment of the invention with the attached drawings. In the drawings, PM designates a pulse motor, A and B are coild thereof which are orthogonal each other. S1-S8 are semi-conductor switch elements which employ a later mentioned combination of mutual opening and closing for making of the current $I_A$, $I_B$ of the coils A, B, breaking thereof and changing passing direction of the current. Herein, when the current $I_A$ is an arrow to the coil A, it is called as A-phase energization and when it is reverse to the arrow it is called as $\overline{A}$-phase energization. Similarly, with respect to the coil B, B-phase energization and $\overline{B}$-phase energization are called in dependence on directions of the current $I_B$. RT is a rotor of the pulse motor. E1 is DC power source for energizing these coils. $R_A$ and $R_B$ are resistors for detecting the electric current of the coils. The switches S5-S5 open and close at high speed as later mentioned during closing period of the switches S1-S4, and carry out chopping control of the coils A and B. Diodes D1-D4 construct an electric circuit for discharging electromagnetic energy which has been stored in the coils A and B during the opening period of said opening and closing at high speed, and are for smoothing the electric current of the coils. CS is a generator for issuing pulse motor control which generates forward pulse and backward pulse of an up-down counter CT at terminals UP and DOWN for giving them to a forward terminal (up) and a backward terminal (down) of the counter CT. This counter CT makes its calculation value in the binary progress and issues output at terminals a1-a4. Table in FIG. 5 shows that the calculation values becomes larger as advancing from upper stage to lower stage. The decoder DE receives the calculation value and gives outputs corresponding to the values of said stages from terminals A, $\overline{A}$, B, $\overline{B}$, A, B. The terminal A is connected to a switch control element t1 of the switch S1 and to one of the inputs of AND circuit AND1 which is a switch control element, and a theoretical value 1 of this terminal A makes as later said the current of the coil A in the arrow direction operative and makes said A-phase energization. The terminal $\overline{A}$ is connected to a switch control element t2 of the switch S2 and to one of the inputs of AND circut AND2 which is a switch control element, and its theoretical value 1 makes similarly $\overline{A}$-phase energization. Similarly, the terminals B, $\overline{B}$ give outputs to t3, AND3, t4, AND4 and make B-phase, $\bar{B}$-phase energizations. A signal of the terminal A is to an input of OR circuit OR1 which multiplies tan 22.5° A-phase energization or $\bar{A}$-phase energization by a later mentioned control when a theoretical value of this terminal is 1. The signal of the terminal B is connected to one of inputs of OR circuit OR, and when the theoretical value is 1 this signal detracts B-phase or $\bar{B}$-phase energization. MM is a monostable multivibrator which enables retriggering and receives at its trigger terminal CP each of signals of the pulse motor control signal generator CS via OR circuit OR3, and its output is received by NOR circuit NOR together with the signals from the terminals $\bar{A}$, $\bar{B}$, and an output therefrom is connected to other inputs of OR circuits OR1, OR2. Outputs of comparators $CP_A$ and $CP_B$ are connected to one side inputs of AND circuits AND1, AND2 for controlling the electric current of the A coil, and to one side inputs of AND circuits AND 3, AND 4 for controlling the electric current of the B coil, in order to open and close the switches S5-S8 at high speed in relation of the switches S5-S8 with the closing period of the switches S1-S4. The comparators $CP_A$ and $CP_B$ receive at reverse input terminals (−) thereof the electric potential of resistors $R_A$, $R_B$ for detecting load electric current of the coils A, B, and receive at non-reverse input terminals (+) thereof the signals of a generator TG which successively issues triangle waves of constant height via connecting capacitors C1, C2. The potentials thereof are added with the electric potential where a standard power source E2 for setting the electric current of the coils is divided constantly by a couple of resistors R1, R2, R3 and a couple of resistors R4, R5, R6. R7, R8 are resistors which reduce the adding amount of the voltage constantly divided and close switches S9, S10 when the resistors OR1, OR2 are 1 of the theoretical value so as to lower the electric potential of the non-reverse input of the comparators $CP_A$, $CP_B$. The couple of the resistor R9 and the capacitor C3 and the couple of the resistor R10 and the capacitor C4 are low pass filters for cutting the high frequency of the pulsation of the coils A, B.

Figure 4:
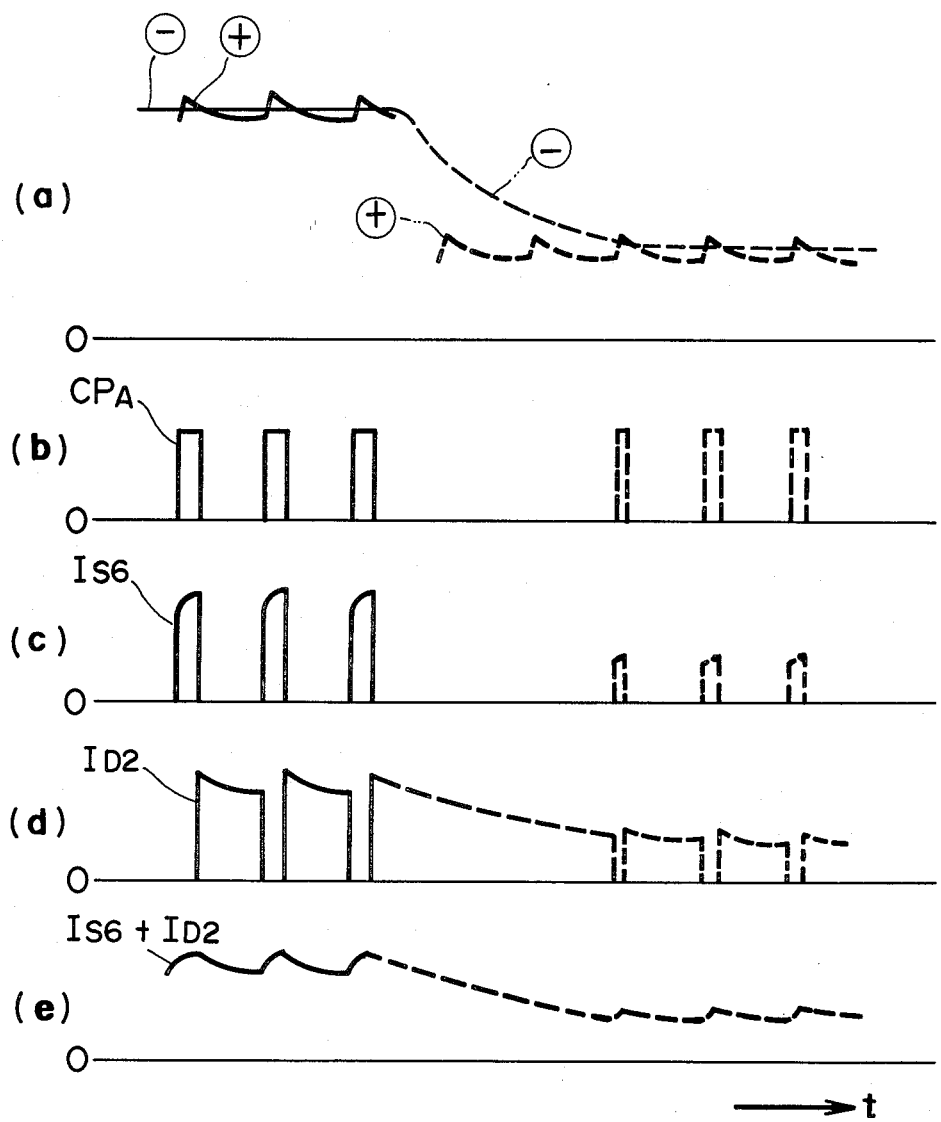
FIGS. 4a–e are wave shapes of voltage or electric current for explaining movement of the above.

A next reference will be made to operation when the pulse motor is driven normally in the above mentioned structure. FIG. 4 is to explain opening and closing operation with one of AND circuits AND1-AND4 in FIG. 3, and shows with the solid line waves of the voltage and the current at respective parts when, for example, the terminal A of the decoder DE is 1 in the theoretical value. Abscissas of (a)-(e) are time (t), and levels 0 are earthing levels or the electric current 0. It is premised that the switches S1, S6 are closed, or opened and closed at the high speed, and the constant electric current (this is the pulsation in this case as later mentioned) flows on the coils A. ⊕ in FIG. 4(a) is the input voltage wave of the non-reverse input terminal (+) of the comparator $CP_A$, which forms repeating waves of the constant wave which superposes the triangle wave by the generator TG and the divided voltage by the resistors R1, R2, R3 in accordance with the power source E2. In this case, it is premised that the switch S9 is inoperative. ⊖ is an input voltage wave of the non-reverse input terminal (−), and in this case, it receives the voltage of the resistor $R_A$ in accordance with the current of the coil, and ripple is cut by the filter of the resistor R9 and the capacitor C3. The triangle voltage ⊕ has a period exceeding the voltage ⊖ per each generation. FIG. 4(b) shows the output voltage of the comparator $CP_A$, which forms rectangular waves becoming high level at period exceeding the voltage ⊖. The driving signal A in the decoder DE closes the switch S1 and makes one of the inputs of AND circuit AND1 high level, and in this duration AND circuit AND1 receives as another input the rectangular wave in FIG. 4(b) and opens and closes the switch S6. Thus the electric current of the coil A passes on the switch S6, the coil A, the switch S1 and the resistor $R_A$. FIG. 4(c) shows the electric current passing on the switch S6, and it is called as $I_{S6}$. An inclination of the current is based on the power source voltage E1, the inductance of the coils, the resistor of the coil and the resistor $R_A$, and has relation with increasing of supplying the electromagnetic energy to the coils. FIG. 4(d) shows the electric current passing on the switch S1, the resistor $R_A$ and the diode D2 by discharging the electromagnetic energy which has been stored in the coil A while the current $I_{S6}$ is 0, and it is called as $I_{D2}$. An inclination of the current is based on the stored electromagnetic energy, said inductance, and the resistance, and has relation with discharging of the electromagnetic energy stored in the coils. FIG. 4(e) shows the total current $I_{S6}+I_{D2}$ of the coil A which is A-phase energization in the arrow mark in FIG. 3. This is a pulsating current passing through the resistor $R_A$, which renders linear the ⊖ voltage in FIG. 4(a). The size of the current ($I_{S6}+I_{D2}$) is determined in that the input and output of the electromagnetic energy of the coils are balanced by crossing point of ⊕ and ⊖ in FIG. 4(a) and length and short of time of ⊕ exceeding ⊖. This fact determines the value of the current of the coil and brings about its feed back effect. Also with respect to $\bar{A}$-phase, B-phase and $\bar{B}$-phase current, the control is carried out as shown in FIG. 4 by the signals of the terminals $\bar{A}$, B and $\bar{B}$ of the decoder DE.

When the terminals A, B and $\bar{B}$ of the decoder DE are 1 in the theoretical value as the vector No. 1 in Table, the coil A has the same A-phase energization as mentioned, and concerning the coil B the signal B of the decoder DE closes the switch S3 and makes one input of the AND circuit AND3 H level, and the signal $\bar{B}$ closes the switch S10 via OR circuit OR2 to make the resistor R8 operative, so that the electric potential of the non-reverse input terminal (+) of the comparator $CP_B$ lowers the level as the inclination of the triangle wave remains the same as shown with the dotted line in FIG. 4(a). The level ratio of these waves is tan 22.5°. When the level of the wave in FIG. 4(a) lowers as shown with the dotted line it is take into consideration that the coil detecting voltage ⊖ moves to the dotted condition from the solid line condition. Since at first the triangle wave ⊕ does not have a crossing point with the detecting voltage ⊖, the current $I_{S1}$ in FIG. 4(c) is 0, and the current $I_{D2}$ of the dotted line is successively lowered by the current in FIG. 4(d), so that the total current ($I_{S6}+I_{D2}$) of the coils lowers as shown in FIG. 4(e). When said wave has a crossing point with the detecting voltage ⊖, the electric current $I_{S6}$ is generated, and finally the level of rising point of this current is made constant, that is, the increasing of the electromagnetic energy and the discharging thereof are balanced and stable current is provided. A couple of the B-phase current x tan 22.5° and the A-phase current generates the vector No. 1 in FIG. 1. The electric current level which becomes stable in the dotted line of FIG. 4(e), shows a value which multiplies tan 22.5° the electric current level of the solid line. This is based on setting the level of the triangle wave shown with the dotted line of FIG. 4(a) by multiplying tan 22.5° of the triangle wave level.

When the terminals A, B of the decoder DE are the theoretical value 1 as the vector No. 2, the coils A and B are both shown with the solid line in FIG. 4, and become A-phase and B-phase energizations and generate the vector No. 2 in FIG. 1. When advancing, so as to increase the vector No., A-phase energization or $\overline{A}$-phase energization by a couple of the terminals A, $\overline{A}$, B, $\overline{B}$, $\overline{A}$, $\overline{B}$ of the decoder DE, or a couple of the energization which multiplies tan 22.5° said energizations and B-phase energization of $\overline{B}$-phase energization or the energization multiplying tan 22.5° these energization, the vector rotating to the clockwise direction in FIG. 1 is obtained, and when advancing upwardly, the vector in the counterclockwise direction is obtained.

In Table of FIG. 5, the data of $\overline{A}$ and $\overline{B}$ show the vector No. of 0 0 every other stage, and this denotes that the coil energization in these stages is the full current energization, and especially when designating 2-phase energization, the consuming electric power of the motor is at the maximum, and the capacity of the power source E1 applying thereto is determined by this electric power. A reference will be made to that the circuit in FIG. 3 multiplies tan 22.5°, that is, makes about 40% the energization by the signal of the stage including 0 0 after confirming that the motor is stopped, so that the consuming electric power of the coil is lowered and the motor is maintained at the stable rotating phase. While the generator CS of the pulse motor control signal generates the pulses forward or backward of the motor, i.e., while the motor is at rotation, the monostable multivibrator MM enabling re-triggering makes a fixed time H level after generating the pulses and in this duration continuousely providing H level, and NOR circuit NOR makes other side inputs of OR circuit OR1, OR2 L level. Thus, the switches S9, S10 are opened and closed only by the signals of the terminals $\overline{A}$, $\overline{B}$ of the decoder DE, and each of the controls in the stages is possible. When the generator CS ceases to generate the pulses, the signal of the multivibrator MM is stopped, that is, after confirming stop of the motor multivibrator MM makes one input of NOR circuit NOR L level. When the signals of the terminals $\overline{A}$, $\overline{B}$ of the decoder DE are 0 0, the inputs of NOR circuit NOR are all 0 and the inputs of OR circuits OR1, OR2 are 1, and the switches S9, S10 are closed, and the triangle wave level to be given to the comparators $CP_A$, $CP_B$ lower as shown with the dotted lines in FIG. 4(a). Such energization is multiplied tan 22.5° which corresponds to the terminal signal showing 1 in the terminals A, $\overline{A}$, B, $\overline{B}$ of the decoder DE at this stopping of the motor. When the signals of the terminals of the decoder DE are 1 0 or 0 1, the output of NOR circuit NOR is 0, so that the switches S9, S10 are opened and closed only by the signals of the terminals $\overline{A}$, $\overline{B}$. That is, the vectors by these stages are not changed when the motor is stopped. With respect to the above mentioned, taking into consideration the vector amount and the rotation thereof in reference to Table and FIG. 1, the vector No. 0 is A × tan 22.5° and A-phase current is lowered and the vector direction is not changed. The vector No. 1 become the same at rotation of the motor. The vector No. 2 is total of (A × tan 22.5°) and (B × tan 22.5°), and since in ( ) A-phase current and B-phase current are reduced at the same constant the vector direction is not changed. Similarly the electric current is reduced at every other vector and since each phase is in the same direction as rotation of the motor, the stopping position is not changed.

We claim:

1. A control circuit for use with a pulse motor, the circuit comprising:
(a) first and second windings, the first and second windings being adapted to be energized either separately or together in a certain predetermined sequence so as to effect control and rotation of the motor, the motor being either rotated thereby in discrete steps or being operated at a stand still;
(b) first and second bridge means, each first and second bridge means having switch means for allowing the first and second windings to be energized;
(c) a sequencer means connected to the first and second bridge means for driving said first and second bridge means in a manner to allow connection and disconnection of the first and second bridge means from a power source provided by the circuit in a predetermined sequence;
(d) a first generator means connected to the sequencer for providing the sequencer with pulse drive motor signals;
(e) a comparative stage connected to the first and second windings and the first bridges and second bridge means, respectively, the comparative stage being adapted to control the switch means in response to receiving a load current of the motor;
(f) a comparison reference changing means connected between the comparator stage and the sequencer for selectively providing the comparator stage with a comparison reference signal in response to receiving motor drive pulse signals, the comparator reference signal comprising a full load current signal and a reduced load current signal;
(g) control means connected between the sequencer and the comparison reference changing means for switching the comparison reference changing means in response to certain motor drive pulse signals so as to enable either one of the first and second windings or both of the first and second windings to be energized with either the full current or the reduced current, whereby the reduced current signal is provided at the comparator stage whom the motor is in a standstill mode of operation.

2. A control circuit as recited in claim 1, wherein the sequencer means comprises and up-down counter and a decoder, the up-down counter being connected between the decoder and the first generator means, the decoder being connected to the first switch means and to the control means.

3. A control circuit as recited in claim 1 having a re-triggering monostable multivibrator connector between the generator means and the comparison reference changing means for operating the comparison reference changing means in response to pulse motor drive signals, the multivibrator being made inoperative when the motor is in at standstill and being operative when the motor is being rotated.

4. A control circuit as recited in claim 2 further comprising:
(a) a second generator means connected to the comparator stage for providing the comparator stage with a constant wave signal input.

5. A control circuit as recited in claim 2 further comprising:
(a) a pair of resistor means connected between said first and second windings and the comparative stages one for each winding, for detecting load current of the first and second windings and providing the comparator stage with the load currents so detected.

* * * * *